United States Patent
Santos et al.

(10) Patent No.: US 9,633,655 B1
(45) Date of Patent: Apr. 25, 2017

(54) VOICE SENSING AND KEYWORD ANALYSIS

(71) Applicant: Knowles Electronics, LLC, Itasca, IL (US)

(72) Inventors: Peter Santos, Los Altos, CA (US); David Klein, Los Altos, CA (US); Hong You, Sunnyvale, CA (US); Jean Laroche, Santa Cruz, CA (US); Michael M. Goodwin, Scotts Valley, CA (US); Sridhar Krishna Nemala, Mountain View, CA (US); Umit Yapanel, Sunnyvale, CA (US); Ye Jiang, Sunnyvale, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/285,585

(22) Filed: May 22, 2014

Related U.S. Application Data

(60) Provisional application No. 61/826,900, filed on May 23, 2013.

(51) Int. Cl.
  *G06F 21/00* (2013.01)
  *G10L 15/20* (2006.01)
  *H04W 12/06* (2009.01)
  *H04W 52/02* (2009.01)

(52) U.S. Cl.
  CPC ............ *G10L 15/20* (2013.01); *H04W 12/06* (2013.01); *H04W 52/0254* (2013.01)

(58) Field of Classification Search
  USPC .......................................................... 726/6
  See application file for complete search history.

(56) References Cited

U.S. PATENT DOCUMENTS

| | | |
|---|---|---|
| 5,822,598 A | 10/1998 | Lam |
| 6,070,140 A | 5/2000 | Tran |
| 6,154,721 A | 11/2000 | Sonnic |
| 6,249,757 B1 | 6/2001 | Cason |
| 6,397,186 B1 | 5/2002 | Bush et al. |

(Continued)

OTHER PUBLICATIONS

Sohn, Jongseo et al., "A Statistical Model-Based Voice Activity Detection", IEEE Signal Processing Letters, vol. 6, No. 1, Jan. 1999, pp. 1-3.

(Continued)

*Primary Examiner* — Jason Lee
(74) *Attorney, Agent, or Firm* — Foley & Lardner LLP (57) ABSTRACT

Methods for voice sensing and keyword analysis are provided. An example method allows for causing a mobile device to transition to a second power mode, from a first power mode, in response to a first acoustic signal. The method includes authenticating a user based at least in part on a second acoustic signal. While authenticating the user, the second acoustic signal is compared to a spoken keyword. The spoken keyword is analyzed for authentication strength based on the length of the spoken keyword, quality of a series of phonemes used to represent the spoken keyword, and likelihood of the series of phonemes to be detected by a voice sensing. While receiving the first and second acoustic signals, a signal to noise ratio (SNR) is determined. The SNR is used to adjust sensitivity of a detection threshold of a voice sensing.

18 Claims, 7 Drawing Sheets

(56) References Cited

U.S. PATENT DOCUMENTS

| | | |
|---|---|---|
| 6,756,700 B2 | 6/2004 | Zeng |
| 7,415,416 B2 | 8/2008 | Rees |
| 7,774,204 B2 | 8/2010 | Mozer et al. |
| 7,957,972 B2 | 6/2011 | Huang et al. |
| 8,275,148 B2 | 9/2012 | Li et al. |
| 8,666,751 B2 | 3/2014 | Murthi et al. |
| 8,972,252 B2 | 3/2015 | Hung et al. |
| 8,996,381 B2 | 3/2015 | Mozer et al. |
| 9,043,211 B2 | 5/2015 | Haiut et al. |
| 9,112,984 B2 | 8/2015 | Sejnoha et al. |
| 2003/0120601 A1 | 6/2003 | Ouye et al. |
| 2003/0173829 A1* | 9/2003 | Zeng ............ G06F 1/3203 307/116 |
| 2006/0074658 A1 | 4/2006 | Chadha |
| 2007/0192877 A1* | 8/2007 | Yoo ............ H01M 10/42 726/34 |
| 2008/0181058 A1 | 7/2008 | Hayakawa |
| 2011/0066429 A1 | 3/2011 | Shperling et al. |
| 2011/0282663 A1 | 11/2011 | Talwar et al. |
| 2012/0087211 A1* | 4/2012 | Lee ............ G08B 13/1609 367/93 |
| 2012/0232896 A1 | 9/2012 | Taleb et al. |
| 2012/0310641 A1 | 12/2012 | Niemisto et al. |
| 2013/0223635 A1 | 8/2013 | Singer et al. |
| 2014/0163978 A1 | 6/2014 | Basye et al. |
| 2014/0244269 A1 | 8/2014 | Tokutake |
| 2014/0257821 A1 | 9/2014 | Adams et al. |
| 2014/0274203 A1 | 9/2014 | Ganong et al. |
| 2014/0274211 A1* | 9/2014 | Sejnoha ............ H04M 1/72519 455/563 |
| 2014/0278435 A1 | 9/2014 | Ganong et al. |
| 2014/0281628 A1 | 9/2014 | Nigam et al. |
| 2014/0343949 A1 | 11/2014 | Huang et al. |
| 2015/0106085 A1 | 4/2015 | Lindahl |
| 2015/0112690 A1 | 4/2015 | Guha et al. |
| 2015/0134331 A1 | 5/2015 | Millet et al. |
| 2015/0205342 A1* | 7/2015 | Ooi ............ G06F 1/3231 713/323 |

OTHER PUBLICATIONS

Cho, Yong Duk et al., "Analysis and Improvement of a Statistical Model-Based Voice Activity Detector", Yong Duk Cho and Ahmet Kondoz, IEEE Signal Processing Letters, vol. 8, No. 10, Oct. 2001, pp. 276-278.

Gerkmann, Timo et al., "Unbiased MMSE-Based Noise Power Estimation with Low Complexity and Low Tracking Delay", IEEE Transactions on Audio, Speech, and Language Processing, vol. 20, No. 4, May 2012, pp. 1383-1393.

Ephraim, Y. et al., "Speech enhancement using a minimum mean-square error short-time spectral amplitude estimator," IEEE Transactions on Acoustics, Speech, and Signal Processing, vol. ASSP-32, No. 6, Dec. 1984, pp. 1109-1121.

Nasibov, Zaur, "Decision Fusion of Voice Activity Detectors," Apr. 16, 2012, University of Eastern Finland, pp. 8-11. http://cs.uef.fi/sipu/2012_MSc_Nasibov_Zaur.pdf.

\* cited by examiner

VOICE SENSING AND KEYWORD ANALYSIS

CROSS-REFERENCE TO RELATED APPLICATION

The present application claims the benefit of U.S. Provisional Application No. 61/826,900, filed on May 23, 2013. The subject matter of the aforementioned application is incorporated herein by reference for all purposes.

FIELD

The present application relates generally to audio processing, and more specifically, to voice sensing, user authentication, and keyword analysis.

BACKGROUND

When a user activates and/or unlocks a mobile device using his or her voice, user authentication should be as secure as possible. However, strong, secure, and/or accurate authentication can require increased power consumption. Sophisticated noise reduction needed for secure and/or accurate authentication can cause the mobile device to exceed its power budget. This increased power consumption can conflict with the requirement for a mobile device to consume as little power as possible.

Furthermore, voice sensing detection might not achieve balance between clean and noisy sound environmental conditions. For example, voice sensing might trigger upon incorrectly detecting a spoken keyword under clean (or reduced noise) conditions (i.e., a false positive). In other situations, voice sensing might not trigger at all due to the inability to detect a spoken keyword under noisy (or increased noise) conditions (i.e., a false negative).

In addition, a mobile device might allow a user to define a spoken keyword to be used in subsequent authentications. However, the user-defined spoken keyword might not be strong enough to prevent false authentications.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In various embodiments, the method for voice sensing and authentication includes causing, for example, a mobile device, to transition to a second power mode from a first power mode in response to a first acoustic signal in a first power mode. The first power mode may consume substantially less power than the second power mode.

A signal to noise ratio (SNR) may be determined based on the first and/or second acoustic signals. Based on the SNR, the sensitivity of a detection threshold can be adjusted. The threshold can be adjusted in such way that voice sensing is more readily triggered under noisy conditions and less readily triggered under clean conditions.

In some embodiments, a keyword used in authentication can be obtained with a learning procedure. While learning, the keyword can be analyzed for authentication strength. The authentication strength can be reported to a user and the user can be asked to provide a stronger keyword. In certain embodiments, the mobile device can be configured to elect features to activate/unlock or deactivate depending on the authentication strength of the keyword.

BRIEF DESCRIPTION OF THE DRAWINGS

Embodiments are illustrated by way of example and not limitation in the figures of the accompanying drawings, in which like references indicate similar elements.

DETAILED DESCRIPTION

The present disclosure provides example systems and methods for voice sensing and authentication. By way of example and not limitation, embodiments of the present disclosure can be practiced on mobile devices. Mobile devices can be portable or stationary. Mobile devices can include: radio frequency (RF) receivers, transmitters, and transceivers; wired and/or wireless telecommunications and/or networking devices; amplifiers; audio and/or video players; encoders; decoders; speakers; inputs; outputs; storage devices; user input devices. Mobile devices include inputs such as buttons, switches, keys, keyboards, trackballs, sliders, touch screens, one or more microphones, gyroscopes, accelerometers, global positioning system (GPS) receivers, and the like. Mobile devices include outputs, such as LED indicators, video displays, touchscreens, speakers, and the like. In some embodiments, mobile devices include handheld devices, such as wired and/or wireless remote controls, notebook computers, tablet computers, phablets, smart phones, personal digital assistants, media players, mobile telephones, and the like.

The mobile devices may be used in stationary and mobile environments. Stationary environments include residencies and commercial buildings or structures. Stationary environments include living rooms, bedrooms, home theaters, conference rooms, auditoriums, and the like. For mobile environments, the systems may be moving with a vehicle, carried by a user, or be otherwise transportable.

According to various example embodiments, a method for providing voice sensing and authentication includes receiving a first acoustic signal while operating in a first power mode. The method can proceed with entering a second power mode in response to receiving the first acoustic signal. The method can continue with receiving a second acoustic signal and authenticating a user based at least in part on the second acoustic signal. In some embodiments, while receiving the first and second acoustic signals, the method allows for determining a signal to noise ratio (SNR) and adjusting, based on the SNR, sensitivity of voice sensing threshold. In some embodiments, a keyword used in authentication is obtained by a method for keyword analysis. The method for keyword analysis can allow for receiving a spoken keyword, analyzing the spoken keyword for authentication strength and reporting the authentication strength to the user.

Figure 1:
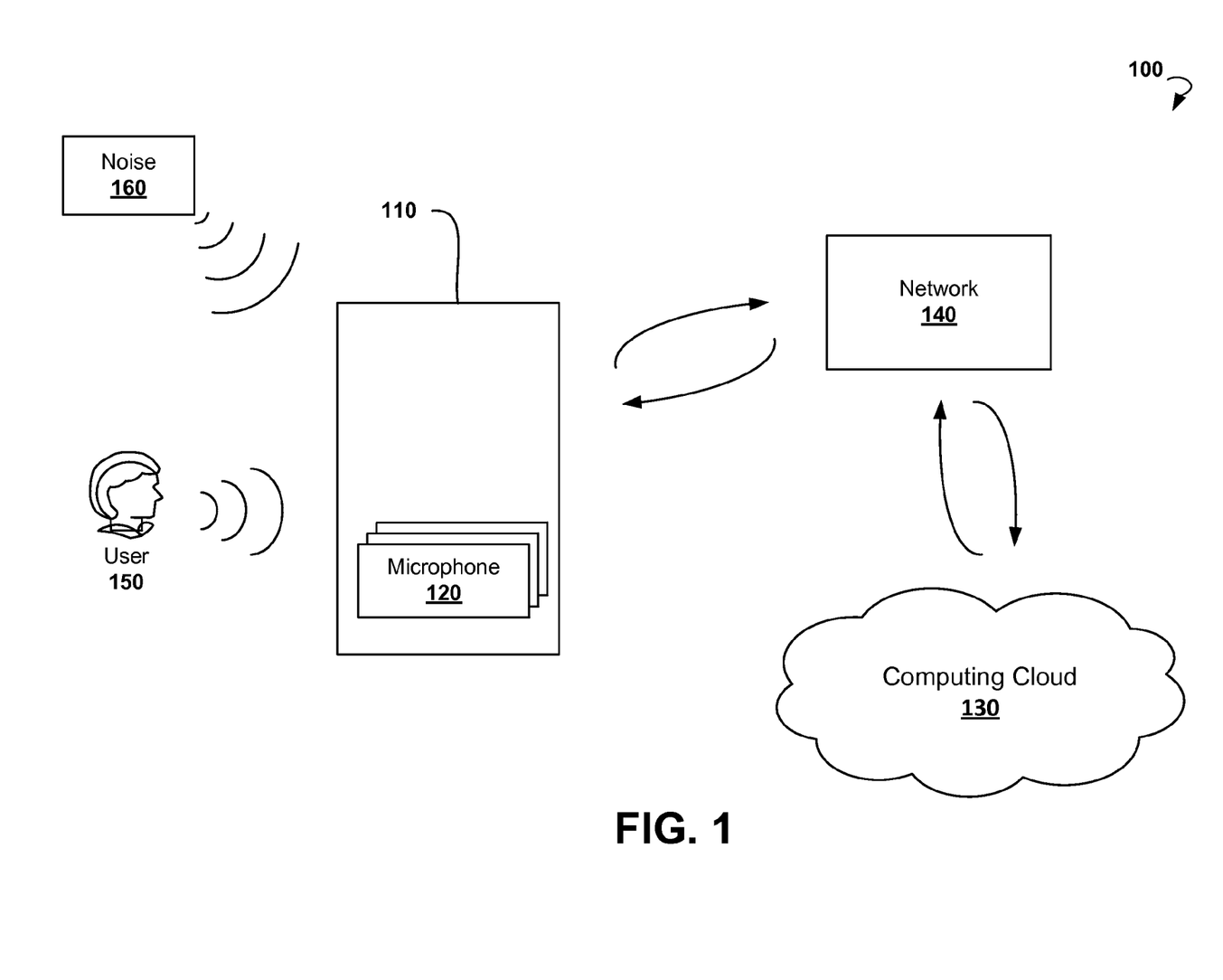
FIG. 1 is an example environment in which a method for voice sensing and authentication can be practiced.

Referring now to FIG. 1, an example environment 100 in which a method for voice sensing and authentication can be implemented is shown. The example environment 100 includes a mobile device 110 and one or more cloud-based computing resources, also referred as a computing cloud(s) 130. The cloud-based computing resource(s) 130 can include computing resources (hardware and software) available at a remote location and accessible over a network (for example, the Internet). The cloud-based computing resources 130 can be shared by multiple users and can be dynamically re-allocated based on demand. The cloud-based computing resources 130 includes one or more server farms/clusters including a collection of computer servers which can be co-located with network switches and/or routers. In various embodiments, the mobile device 110 can be connected to the computing cloud 130 via one or more wired or wireless communications networks 140.

In various embodiments, the mobile device 110 can be operable to receive acoustic signal(s). In some embodiments, the mobile device is operable to receive acoustic sound(s) from a user 150. In certain embodiments, the mobile device includes one or more microphones 120 and the acoustic signal(s) is captured by the one or more microphones.

In various embodiments, the mobile device is further operable to process the received acoustic input signal(s) to detect voice, one or more spoken keyword(s), and so forth. In some embodiments, the mobile device is operable to transmit the received acoustic signal(s) and/or processed acoustic signal to computing cloud 130 for further processing.

In various embodiments, the acoustic input signals can be contaminated by a noise 160. Noise is unwanted sound present in the environment which can be detected by, for example, sensors such as microphones 120. In stationary environments, noise sources can include street noise, ambient noise, sound from the mobile device such as audio, speech from entities other than an intended speaker(s), and the like. Mobile environments can encounter certain kinds of noise which arise from their operation and the environments in which they operate, for example, road, track, tire/wheel, fan, wiper blade, engine, exhaust, entertainment system, communications system, competing speakers, wind, rain, waves, other vehicles, exterior, and the like.

Figure 2:
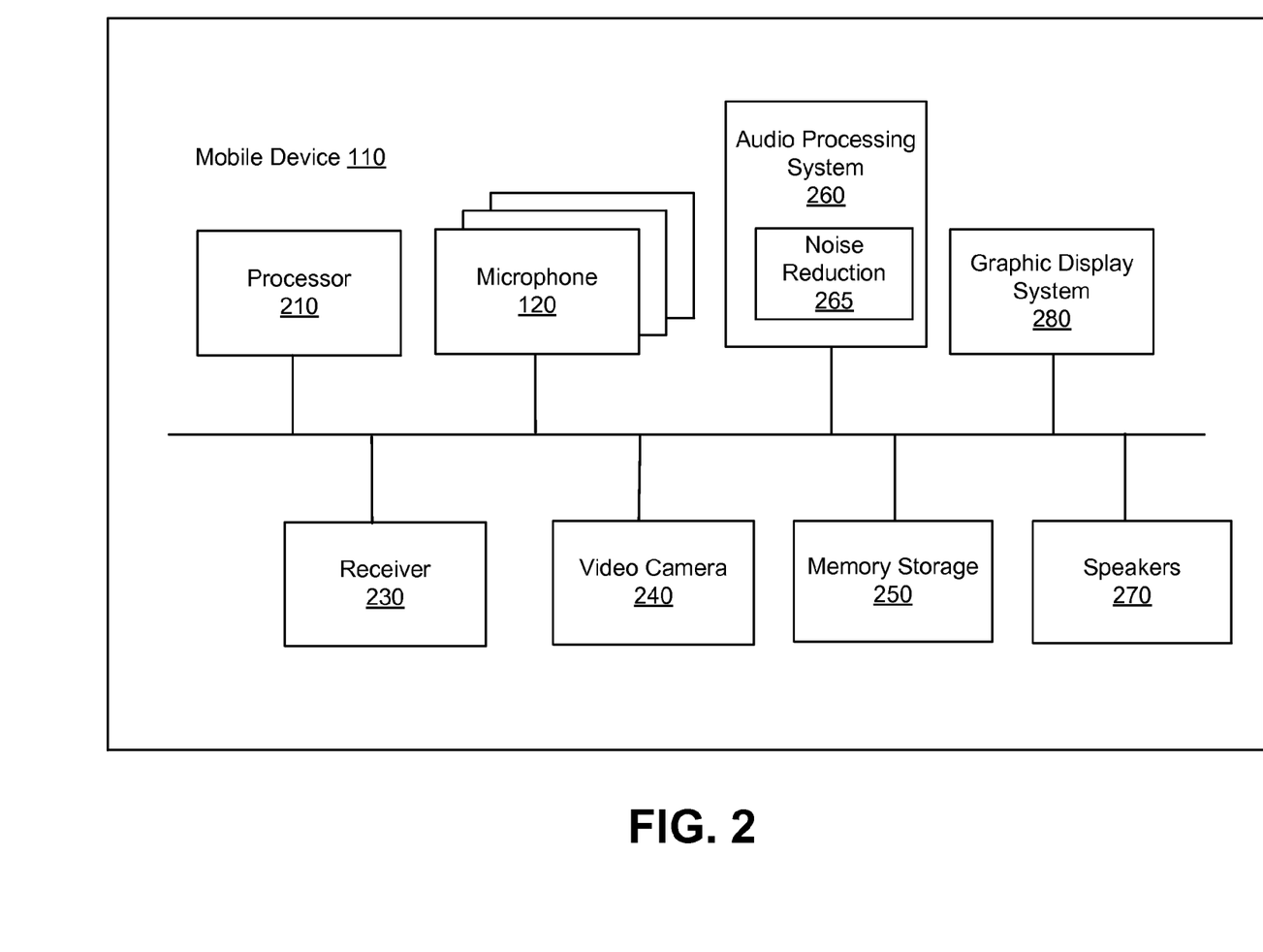
FIG. 2 is a block diagram of a mobile device that can implement a method for voice sensing and authentication, according to various embodiments.

FIG. 2 is a block diagram of a mobile device 110 that can implement a method for voice sensing and authentication, according to an example embodiment. The FIG. 2 provides details of the mobile device 110 of FIG. 1. In the illustrated embodiment, the mobile device 110 includes a processor 210, one or more microphones 120, a receiver 230, memory storage 250, an audio processing system 260, speakers 270, a graphic display system 280, and an optional video camera 240. The mobile device 110 includes additional or other components necessary for operations of mobile device 110. Similarly, in other embodiments, the mobile device 110 includes fewer components that perform functions similar or equivalent to those depicted in FIG. 2.

The processor 210 includes hardware and/or software, which is operable to execute computer programs stored in a memory storage 250. The processor 210 may use floating point operations, complex operations, and other operations, including voice sensing and authentication.

The graphic display system 280 provides a user graphic interface. In some embodiments, a touch screen associated with the graphic display system can be utilized to receive an input from a user. The options can be provided to a user via an icon or text buttons once the user touches the screen.

The audio processing system 260 can be configured to receive acoustic signals from an acoustic source via one or more microphone 120 and process the acoustic signal components. The microphones 120 can be spaced a distance away such that the acoustic waves impinging on the device from certain directions exhibit different energy levels at the two or more microphones. After reception by the microphones 120, the acoustic signals can be converted into electric signals. These electric signals can, in turn, be converted by an analog-to-digital converter (not shown) into digital signals for processing in accordance with some embodiments.

In various embodiments, where the microphones 120 are omni-directional microphones that are closely spaced (e.g., 1-2 cm apart), a beamforming technique can be used to simulate a forward-facing and backward-facing directional microphone response. A level difference can be obtained using the simulated forward-facing and backward-facing directional microphone. The level difference can be used to discriminate speech and noise in, for example, the time-frequency domain, which can be used in noise and/or echo reduction. In certain embodiments, some microphones 120 are used mainly to detect speech and other microphones are used mainly to detect noise. In other embodiments, some microphones 120 are used to detect both noise and speech.

In some embodiments, in order to suppress the noise, an audio processing system 260 includes a noise reduction module 265. The noise reduction can be carried out by the audio processing system 260 and noise reduction module 265 of the mobile device 110 based on inter-microphone level difference, level salience, pitch salience, signal type classification, speaker identification, and so forth. By way of example and not limitation, noise reduction methods are described in U.S. Utility patent application Ser. No. 12/215,980, filed Jun. 30, 2008, and in U.S. Utility patent application Ser. No. 11/699,732, filed Jan. 29, 2007, which are incorporated herein by reference in their entireties.

Figure 3:
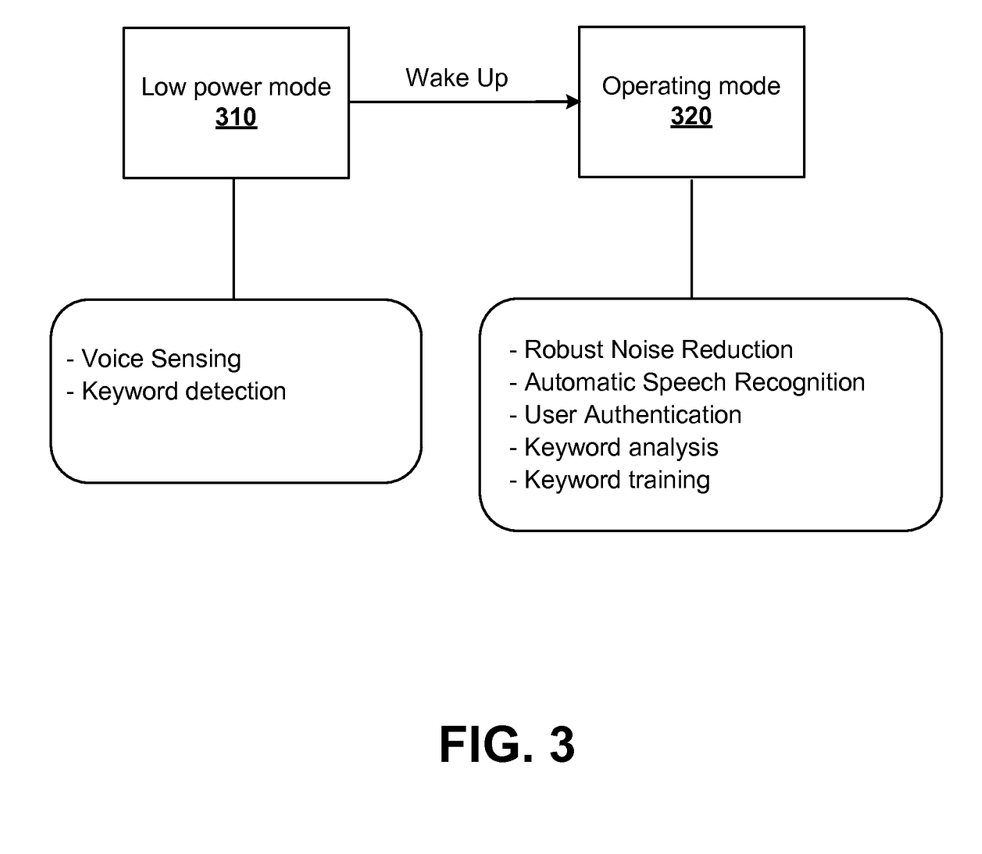
FIG. 3 is a block diagram showing modes of a mobile device, according to an example embodiment.

FIG. 3 is a block diagram showing modes of the mobile device 110, according to an example embodiment. The mobile device may operate in at least two modes: a lower power mode 310 (or power saving mode) and operating mode 320.

In various embodiments, the mobile device may operate in a lower power mode when not operated by a user, for example, when a phone call is not initiated or in progress, a software application (for example, mobile application) is not being used, and the like. When not being operated, at least some of the mobile device's hardware (for example, radio frequency front end, analog baseband, digital baseband, baseband processor, peripherals, and so forth) is powered down or otherwise maintained in a low-power state, to conserve the mobile device's power, for example battery power.

When the user wants to utilize one or more features of the mobile device, the mobile device may, in response to an indicia received from the user, transition from the low-power mode to an operating mode. The mobile device may be said to "wake up" during such a transition. When in the operating mode, the mobile device's hardware may consume more power than in the low-power mode. The indicia, for example, include an input from a button of the mobile device. The indicia also include, for example, receipt of a keyword (or phrase) spoken by the user (speaker). The keyword may be received by one or more microphone 120 of the mobile device 110. The detection of the keyword can be referred to as voice sensing.

In some embodiments, alternatively or additionally, the mobile device limits access to the user while in the low-power mode until the operating mode is changed to awake. The user may be authenticated before (full or partial) access to the mobile device is allowed. Authentication is a process of determining whether someone is who he or she purports to be. Authentication can be important for protecting information and/or data and services accessible on or from the mobile device from unintended and/or unauthorized access, change, or destruction (i.e., computer security). One authentication technology uses audible input such as a spoken keyword (and automatic speech recognition (ASR)). Authentication based on audible input (and ASR) must be accurate to protect sensitive information/data and services.

According to various embodiments, a two-stage approach may be included wherein the user can wake up the mobile device with a stock (not created by the user) keyword or a user-defined keyword that may not have any authentication. Upon awaking the mobile device, a different, stronger method can be used for authentication, for example, using the keyword spoken by the user or a different keyword. Such a stronger method can use advanced noise reduction to achieve better performance during authentication.

In some embodiments, the stock keyword can be spoken to wake the mobile device up and a different (stock or user-defined) keyword spoken for authentication. By way of further example, the stock keyword can be spoken to wake the mobile device up and spoken again for authentication, or the stock keyword can be spoken once (and buffered in the mobile device's memory storage) to wake the mobile device up and to authenticate the user.

In some embodiments, voice sensing consumes less power than authentication. Various embodiments of present disclosure can offer the benefits of using noise-reduction to improve voice-sensing results, while keeping the power within a small budget allocated for the feature. Strong, noise-robust voice-sensing and authentication may be very desirable features, as in practice earlier standard techniques work much less reliably (if at all) in noisy environments.

In some embodiments, a signal to noise ratio (SNR) may be determined based at least on an audio signal received by the one or more microphones 120 of the mobile device 110. The SNR may be a measure comparing the level of a desired signal (for example, speech from a user) to noise. Based on the SNR, the sensitivity of a detection threshold can be adjusted/adapted. For example, the detection threshold may be adjusted, such that voice sensing is more readily triggered under noisy conditions, voice sensing is less readily triggered under clean conditions, or combinations thereof.

In various embodiments, the user is authenticated before access to the mobile device is allowed. The authentication may be based at least in part on the spoken keyword. Authentication is a process of determining whether someone is who he or she purports to be. Authentication can be important for protecting information and/or data and services accessible on or from the mobile device from unintended and/or unauthorized access, change, or destruction (that is, computer security). Certain authentication embodiments rely on audible input (and automatic speech recognition (ASR)). Authentication based on audible input (and ASR) must be accurate to protect sensitive information/data and services.

In some embodiments, the mobile device is trained with the stock and/or user-defined keyword(s) for authentication of a certain user(s). For example, a certain user speaks the authentication keyword at least once. Based at least in part on the spoken keyword sample(s) received from the certain user by one or more microphones 120 of the mobile device 110, data representing the keyword spoken by the certain user can be stored. Training can be performed on the mobile device 110, cloud-based computing resource(s) 130 (shown in FIG. 2), or combinations thereof. A spoken keyword received during subsequent authentication may be compared to the stored data to determine whether the speaker is the same as a certain user.

A voice triggered device wake up (i.e., voice sensing, keyword detection, and so forth) can allow a user to specify his/her own user-defined keyword, for example, by saying it 4 times in a row, so that the device can "learn" the keyword (training the mobile device). Thereafter, the new keyword can then be used to wake-up the device and/or unlock the device (authentication). The mobile device can authenticate the user based at least in part on the one or more keywords or phrases received from the user. For example, a spoken keyword received during the authentication can be compared to information created during training to determine whether the speaker is an authorized user.

The performance of these user-defined keywords during authentication can depend on the chosen keyword. By way of example and not limitation, a short keyword, composed of indiscriminative phonemes, may not be very strong, while a longer keyword that uses a combination of phonemes rarely used in normal speech may be much stronger. Various embodiments of the present invention can perform analysis of the chosen keyword(s) to evaluate its (relative) strength and provide feedback to the user about the strength. For example, the user can be advised of the (relative) strength of the keyword and (optionally) given the opportunity to provide a stronger keyword.

Additionally or alternatively, the mobile device is configured to unlock selective features (for example, a full unlock for a strong keyword, but only a few features if the keyword is weak), as a function of keyword strength. For example, the user is advised regarding the strength of the keyword and corresponding limits on access (for example, locked and/or unlocked features of the mobile device). By way of further example, the user is further advised to provide a stronger keyword to unlock additional features.

In some embodiments, the keyword is analyzed according to its length, the quality of the phonemes used, the likelihood of the phonemes as detected by the voice sensing system, and an evaluation of how common the series of phonemes is in a standard dictionary. A phoneme may, for example, be a basic unit of a language's phonology, which is combined with other phonemes to form meaningful units such as words or morphemes. Phonemes can, for example, be used as building blocks for storing spoken keywords. As would be readily appreciated by one of ordinary skill in the art, other variations of phoneme-based sequences may be used, such as triphones.

In various embodiments, authentication is performed on the mobile device 110, on cloud-based computing resources 130, or combinations thereof.

Figure 4:
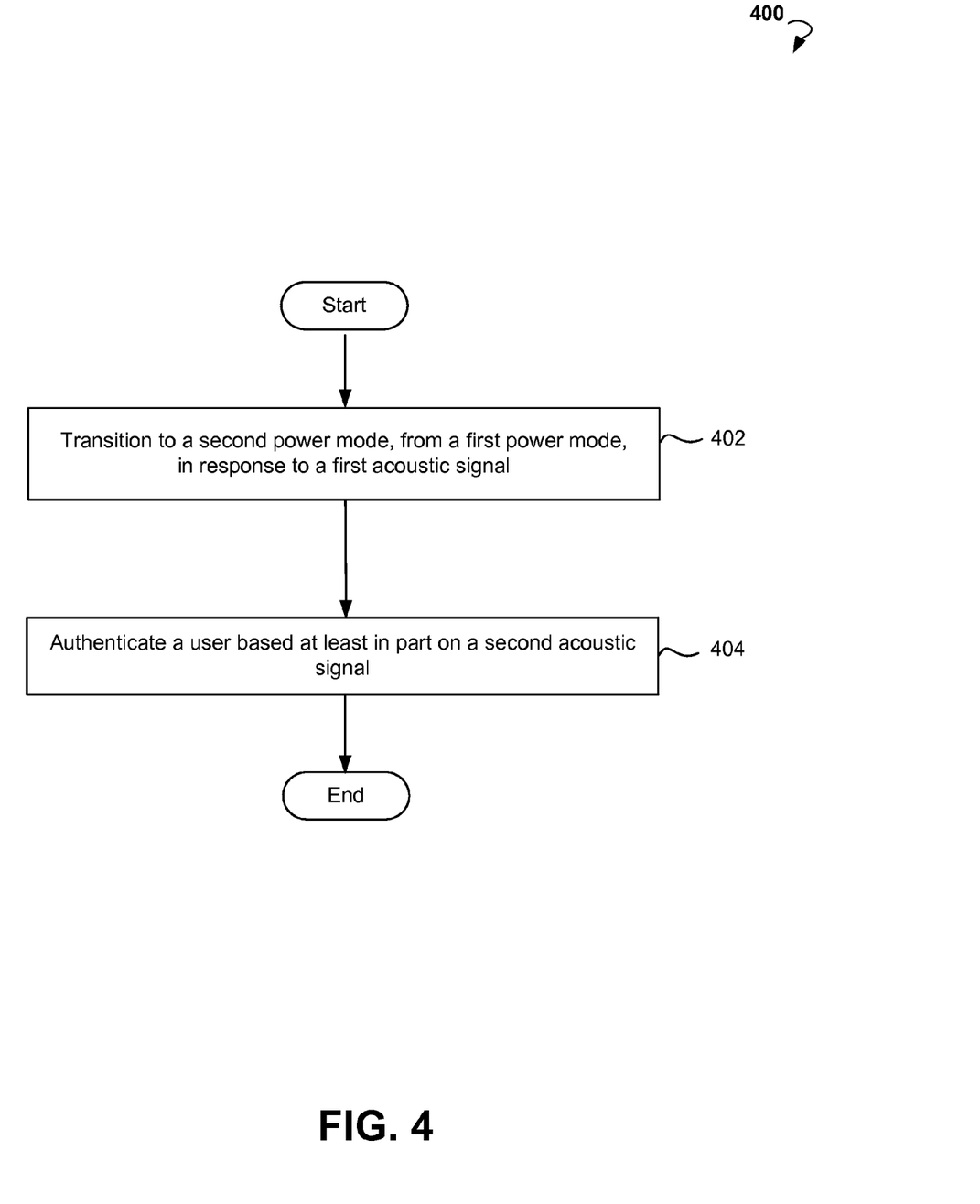
FIG. 4 is a flow chart showing steps of a method for voice sensing and authentication, according to an example embodiment.

FIG. 4 is a flow chart showing steps of a method 400 for voice sensing and authentication, according to example embodiment. The method 400 is implemented in the mobile device 110 (shown in FIG. 1 and FIG. 2). The method 400 can commence at step 402 with transitioning to a second power mode in response to receiving a first acoustic signal while operating in a first power mode. In step 404, the method 400 concludes with authenticating a user based at least in part on a second acoustic signal.

According to an exemplary embodiment, a system for voice sensing and keyword analysis authentication is provided. An exemplary system includes a wakeup module configured to be stored in memory and executable, using at least one hardware processor, for causing a mobile device to transition to a second power mode, from a first power mode, in response to a first acoustic signal, the first acoustic signal representing at least one captured sound; and an authentication module configured to be stored in memory and executable, using at least one hardware processor, for, in the second power mode, authenticating a user, using at least one hardware processor, based at least in part on a second acoustic signal, the second acoustic signal representing at least one captured sound.

Figure 5:
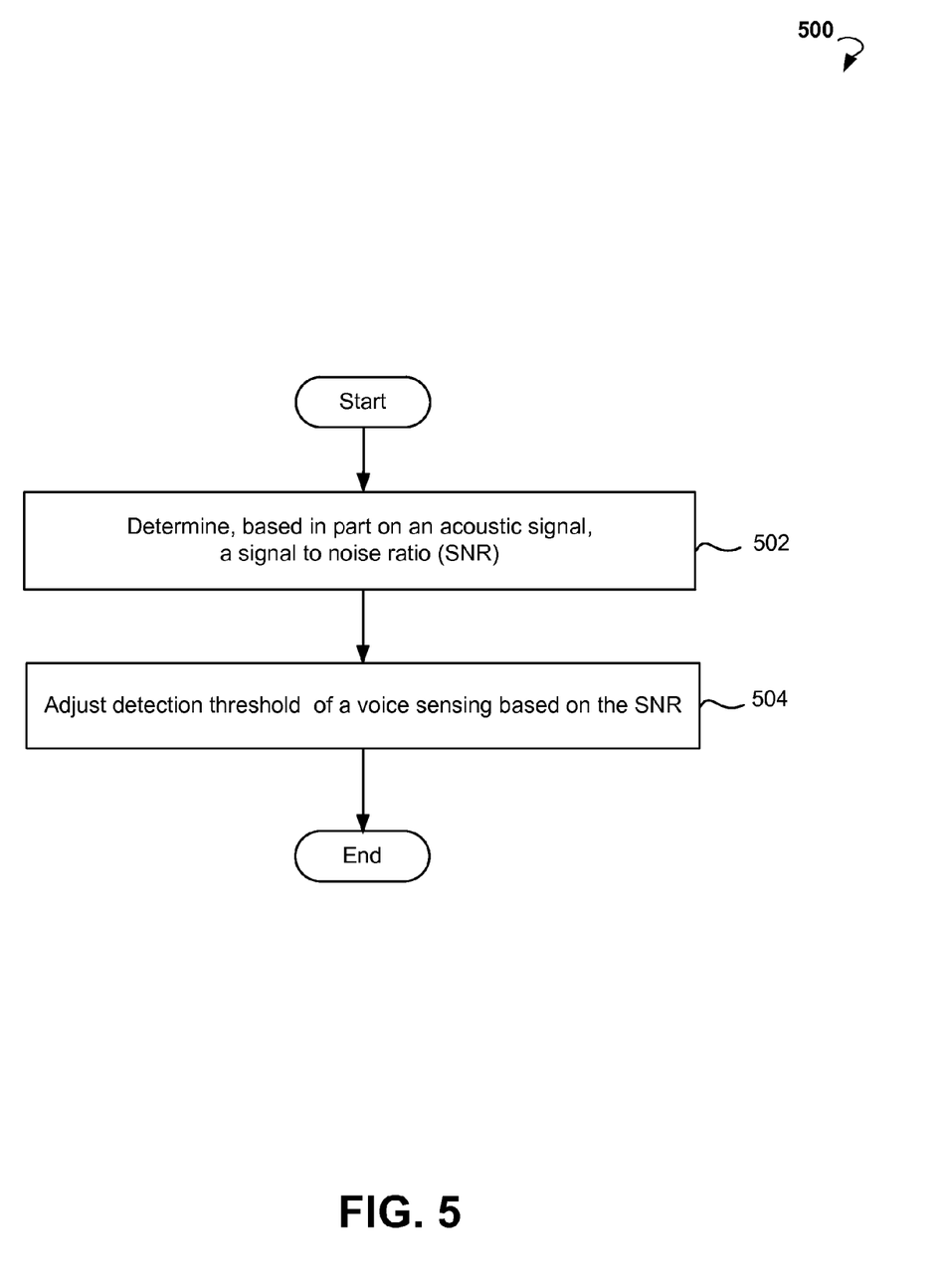
FIG. 5 is a flow chart showing steps of a method for voice sensing, according to an example embodiment.

FIG. 5 is a flow chart showing steps of a method 500 for voice sensing, according to an example embodiment. The method 500 can be implemented in the mobile device 110 (shown in FIG. 1 and FIG. 2). In some embodiments, the steps of the method 500 can be combined with step 404 and, additionally or alternatively, step 402 of the method 400 for voice sensing and authentication shown in FIG. 4. The illustrated method 500 can commence at step 502 with determining a signal to noise ratio (SNR) based on an acoustic signal. In step 504, the method 500 can conclude with adjusting detection threshold of a voice sensing.

Figure 6:
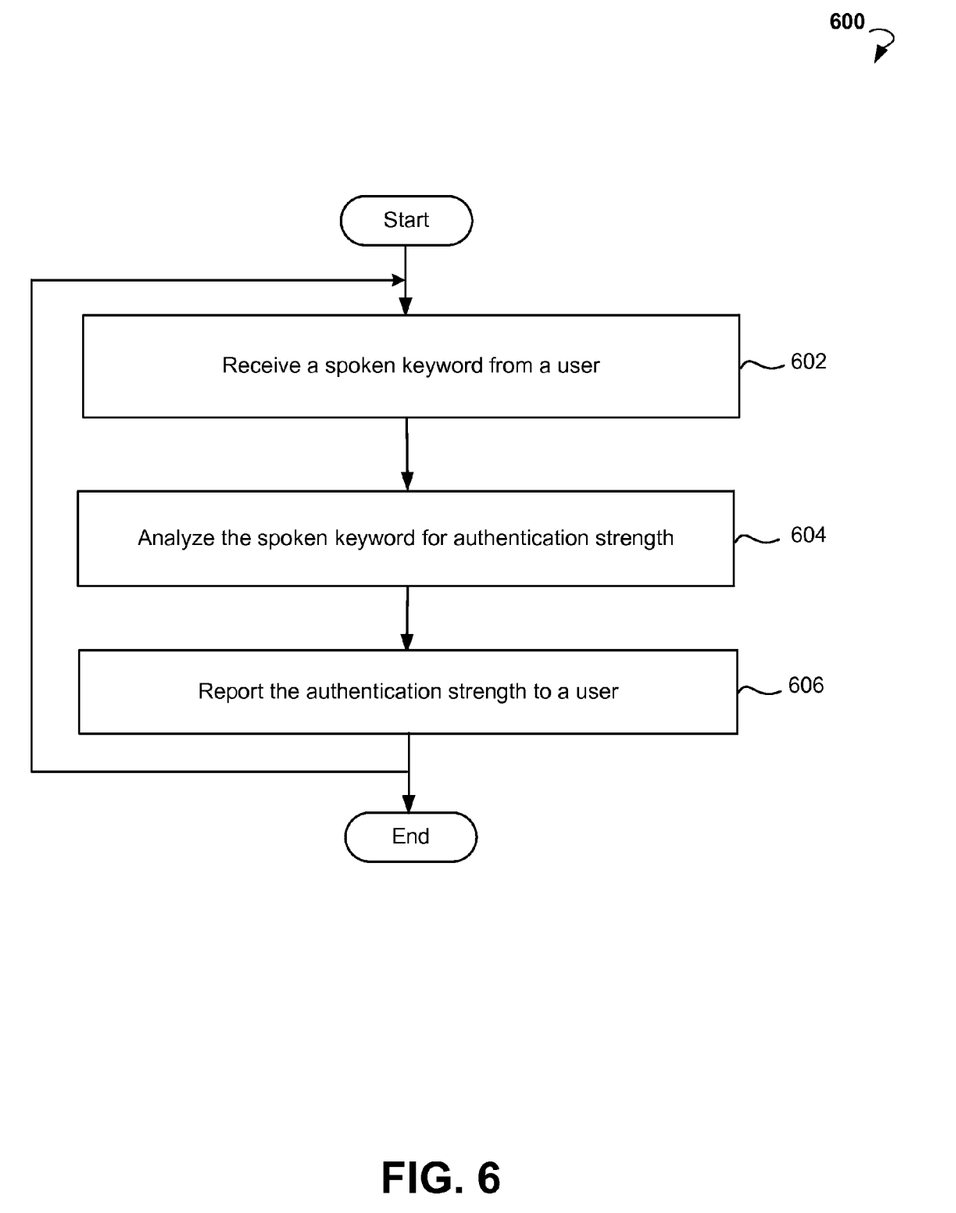
FIG. 6 is a flow chart showing steps of a method for keyword analysis, according to an example embodiment.

FIG. 6 is a flow chart showing steps of a method 600 for analyzing a keyword, according to an example embodiment. The method 600 can be implemented in mobile device 110 (shown in FIG. 1 and FIG. 2). The illustrated method 600 can commence at step 602 with receiving a spoken keyword from a user. In step 604, the method 600 can proceed with analyzing the spoken keyword for authentication strength. In step 606, the method 600 can continue with reporting the authentication strength to the user. The steps 602-606 of the method 600 can be repeated until a keyword with desired authentication strength is obtained. In some embodiments, the resulting keyword obtained by the method 600 can be used in step 404 of the method 400 for voice sensing and authentication (shown in FIG. 4) while authenticating a user.

Figure 7:
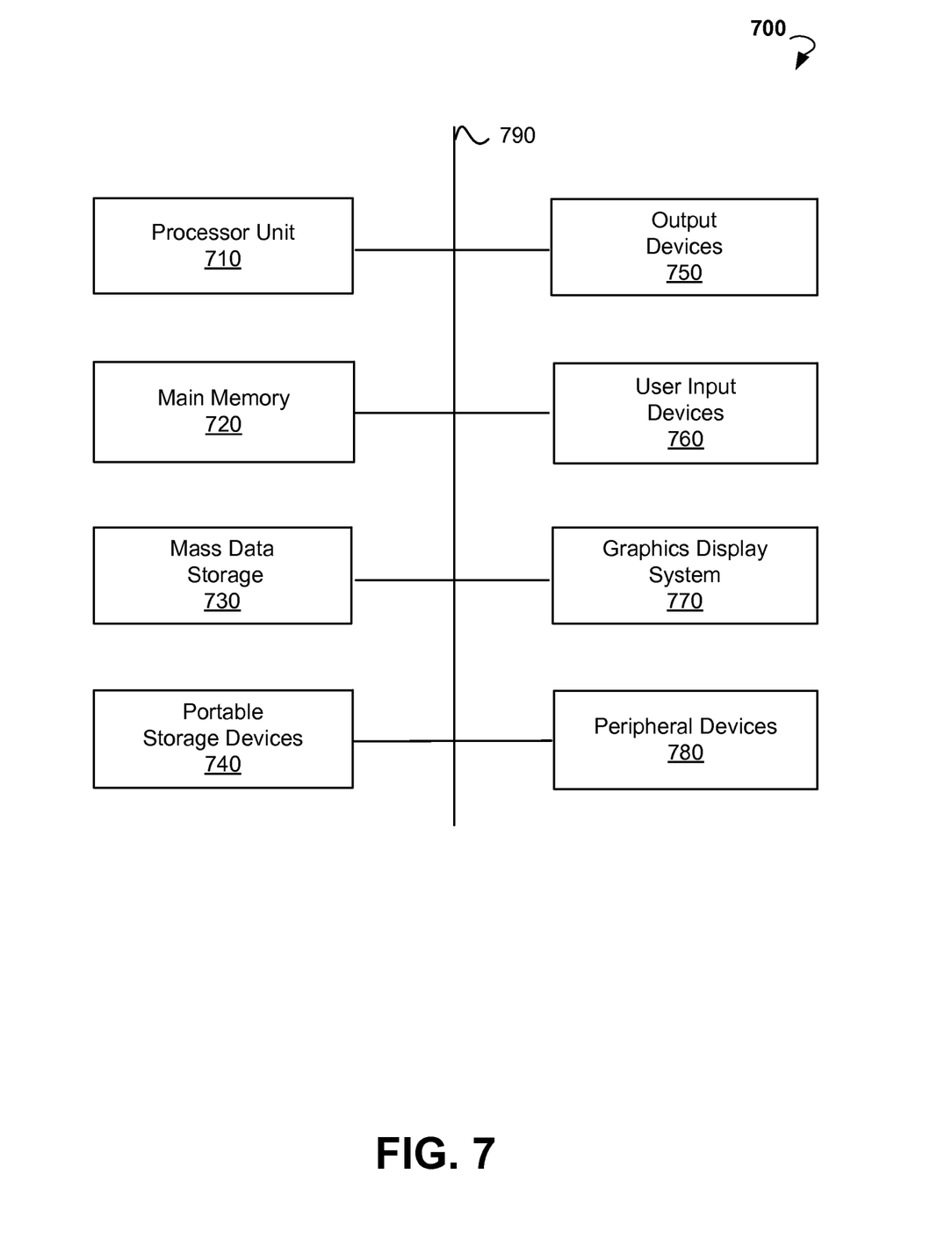
FIG. 7 is an example of a computer system implementing a method for voice sensing and authentication, according to an example embodiment.

FIG. 7 illustrates an example computer system 700 that may be used to implement embodiments of the present disclosure. The computer system 700 of FIG. 7 can be implemented in the contexts of the likes of computing systems, networks, servers, or combinations thereof. The computer system 700 of FIG. 7 includes one or more processor units 710 and main memory 720. Main memory 720 stores, in part, instructions and data for execution by processor unit 710. Main memory 720 stores the executable code when in operation. The computer system 700 of FIG. 7 further includes a mass data storage 730, portable storage devices 740, output devices 750, user input devices 760, a graphics display system 770, and peripheral devices 780. The methods may be implemented in software that is cloud-based.

The components shown in FIG. 7 are depicted as being connected via a single bus 790. The components may be connected through one or more data transport means. Processor unit 710 and main memory 720 is connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit 710. Mass data storage 730 stores the system software for implementing embodiments of the present disclosure for purposes of loading that software into main memory 720.

Portable storage device 740 operates in conjunction with a portable non-volatile storage medium, such as a compact disk, digital video disc, floppy disk, or Universal Serial Bus (USB) storage device, to input and output data and code to and from the computer system 700 of FIG. 7. The system software for implementing embodiments of the present disclosure is stored on such a portable medium and input to the computer system 700 via the portable storage device 740.

User input devices 760 provide a portion of a user interface. User input devices 760 include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices include speakers, printers, network interfaces, and monitors.

Graphics display system 770 include a liquid crystal display (LCD) or other suitable display device. Graphics display system 770 receives textual and graphical information and processes the information for output to the display device.

Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a personal computer (PC), hand held computing system, telephone, mobile computing system, workstation, tablet, phablet, wearable, mobile phone, server, minicomputer, mainframe computer, or any other computing system. The computer may also include different bus configurations, networked platforms, multi-processor platforms, and the like. Various operating systems may be used including UNIX, WINDOWS, QNX, PALM OS, LINUX, ANDROID, CHROME, IOS, and TIZEN, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as solid state disks, optical or magnetic disks and dynamic memory, respectively. Common forms of computer-readable storage media include a flexible disk, floppy disk, hard disk, magnetic tape, any other magnetic storage medium, a Compact Disk Read Only Memory (CD-ROM) disk, digital video disk (DVD), BLU-RAY DISC (BD), any other optical storage medium, Random-Access Memory (RAM), Programmable Read-Only Memory (PROM), Erasable Programmable Read-Only Memory (EPROM), Electronically Erasable Programmable Read Only Memory (EEPROM), flash memory, and/or any other memory chip, module, or cartridge.

The computer system 700 may be implemented as a cloud-based computing environment, such as a virtual machine operating within a computing cloud. In other embodiments, the computer system 700 includes a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource typically combining the computational power of a large grouping of processors (such as within web servers) and/or combining the storage capacity of a large grouping of computer memories or storage devices. Systems providing cloud-based resources may be utilized exclusively by their owners or such systems may be accessible to outside users who deploy applications within the computing infrastructure to obtain the benefit of large computational or storage resources.

The cloud may be formed, for example, by a network of web servers comprising a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method for voice sensing and authentication, the method comprising:
   causing a peripheral device to transition to a second power mode, from a first power mode, in response to a first acoustic signal, the first acoustic signal representing at least one captured sound;
   determining a signal to noise ratio based on at least one of the first acoustic signal and a second acoustic signal, the second acoustic signal representing another at least one captured sound;
   adapting, based on the signal to noise ratio, sensitivity of a detection threshold of voice sensing;
   in the second power mode, authenticating a user, using at least one hardware processor, based at least in part on the second acoustic signal, the authenticating of the user comprising matching the second acoustic signal to a spoken keyword previously obtained using keyword analysis; and
   applying noise reduction to the second acoustic signal prior to the authenticating of the user.

2. The method of claim 1, wherein the first power mode consumes less power than the second power mode.

3. The method of claim 1, wherein
   the first acoustic signal includes one of the following: a first user-defined spoken keyword and a stock keyword; and
   the second acoustic signal includes a second user-defined spoken keyword.

4. The method of claim 1, wherein the voice sensing is more readily triggered under a noisy environment condition and less readily triggered under a clean environment condition.

5. The method of claim 1, wherein the keyword analysis comprises:
   receiving the spoken keyword from the user;
   analyzing the spoken keyword for authentication strength; and
   reporting the authentication strength to the user.

6. The method of claim 5, wherein the authentication strength is determined based on one or more of the following:
   a length of the spoken keyword;
   a quality of a series of phonemes used to represent the spoken keyword;
   a likelihood of the series of phonemes to be detected by a voice sensing; and
   an evaluation of a frequency of the series of phonemes in a standard dictionary.

7. A computer program product comprising a non-transitory computer-readable storage medium having embodied thereon instructions, which when executed by one or more processors, perform a method for voice sensing and keyword analysis, the method comprising:
   receiving a first acoustic signal while operating in a first power mode;
   entering a second power mode in response to receiving the first acoustic signal;
   receiving a second acoustic signal;
   determining a signal to noise ratio based on at least one of the first and second acoustics signals;
   adapting, based on the signal to noise ratio, sensitivity of a detection threshold of voice sensing;
   authenticating a user based at least in part on the second acoustic signal, the authenticating of the user comprising matching the second acoustic signal to a spoken keyword previously obtained using keyword analysis; and
   applying noise reduction to the second acoustic signal prior to the authenticating of the user.

8. The computer program product of claim 7, wherein the first power mode consumes less power than the second power mode.

9. The computer program product of claim 7, wherein
   the first acoustic signal includes one of the following: a first user-defined spoken keyword and a stock keyword; and
   the second acoustic signal includes a second user-defined spoken keyword.

10. The computer program product of claim 7, wherein the voice sensing is more readily triggered under a noisy environment condition and is less readily triggered under a clean environment condition.

11. The computer program product of claim 7, wherein the keyword analysis comprises:
    receiving the spoken keyword from the user;
    analyzing the spoken keyword for authentication strength; and
    reporting the authentication strength to the user.

12. The computer program product of claim 11, wherein the authentication strength is determined based on one or more of the following:
- a length of the spoken keyword;
- a quality of a series of phonemes used to represent the spoken keyword;
- a likelihood of the series of phonemes to be detected by a voice sensing; and
- an evaluation of a frequency of the series of phonemes in a standard dictionary.

13. The computer program product of claim 12, wherein selected features of a mobile device are activated or deactivated based, at least in part, on the authentication strength.

14. A system for voice sensing and authentication, the system comprising:
- a wakeup module configured to be stored in memory and executable, using at least one hardware processor, for causing electronic hardware to transition to a second power mode, from a first power mode, in response to a first acoustic signal, the first acoustic signal representing at least one captured sound, the wakeup module further configured for determining a signal to noise ratio based on at least one of the first acoustic signal and a second acoustic signal, the second acoustic signal representing another at least one captured sound; and adapting, based on the determined signal to noise ratio, sensitivity of a detection threshold of a voice sensing;
- an authentication module configured to be stored in memory and executable, using at least one hardware processor, for, in the second power mode, authenticating a user, using at least one hardware processor, based at least in part on the second acoustic signal, the authenticating of the user comprising matching the second acoustic signal to a spoken keyword previously obtained using keyword analysis; and
- a noise reduction module configured to be stored in memory and executable, using at least one hardware processor, for applying noise reduction to the second acoustic signal prior to the authenticating of the user.

15. The method of claim 1, wherein the peripheral device comprises an audio processor.

16. The system of claim 14, wherein the electronic hardware is selected from a group comprising a receiver, graphic display system, processor, and peripheral device.

17. The system of claim 14, wherein the electronic hardware comprises an audio processor.

18. The system of claim 14, wherein the electronic hardware comprises a peripheral device.

* * * * *